Feb. 7, 1939.    B. CHRISTIANSEN    2,146,625
METHOD FOR REDUCING METAL OXIDES
Filed Oct. 20, 1936    2 Sheets-Sheet 1
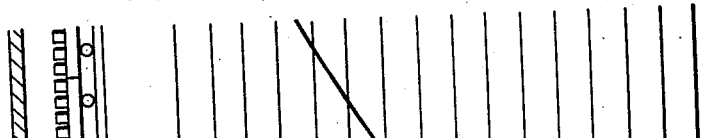

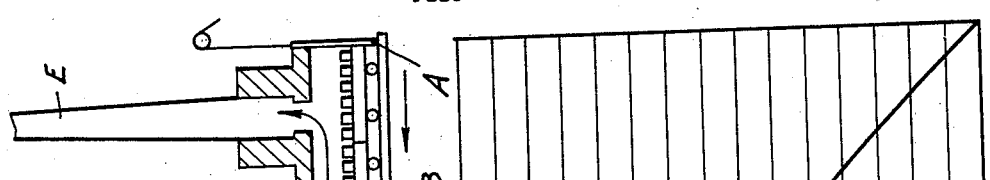

Patented Feb. 7, 1939

2,146,625

UNITED STATES PATENT OFFICE 2,146,625

METHOD FOR REDUCING METAL OXIDES

Bror Christiansen, Smedjebacken, Sweden

Application October 20, 1936, Serial No. 106,668
In Sweden May 10, 1933

11 Claims. (Cl. 75—36)

It was already proposed to reduce pulverulent oxide ores by means of a solid, pulverulent carbon material at such a temperature that the reduction is carried out, though the metal obtained is not molten. Generally, the mixture of carbon material and oxide ore is formed to blocks or briquettes, which are heated to the reduction temperature in the absence of air. It was also proposed to add the carbon material in excess and to carry out the reduction in an oxidizing atmosphere and thereafter remove the excess of carbon by a dressing or enriching process.

To attain the heat necessary for the reduction it is also known to permit the gas containing carbon monoxide formed at the reduction to burn in the presence of air in and around the charge, but in carrying out this method it was heretofore unavoidable that the metal formed was partially re-oxidized, especially on the surfaces of the product and at the end of the reduction process. To avoid said drawback it was also proposed to make a pre-reduction in the presence of air and to carry out the final reduction in the absence of air in a closed chamber by means of indirect heating. In this final reduction also additional reduction gas is supplied which is subsequently burnt to generate heat for the process.

It is also known to carry out the reduction in closed containers, heating them by external heating to such a high temperature that the charge is sintered.

In spite of the numerous prior processes proposed no method based upon heating a mixture of iron oxide powder and coal powder has in the practice been used to any considerable extent. This depends probably primarily on the fact that in carrying out the prior methods the reduction is effected too slowly and that re-oxidation cannot be avoided. In using electric heating the consumption of energy is too high to render the process economical. The velocity of the reduction increases at increasing temperatures, because higher quantities of heat per unit of time may then be supplied to the process, which is generally highly endothermic, but it is difficult to carry out the process economically at the high temperature with an efficient supply of heat and without re-oxidation. In certain known methods, in which the charge must be loose, for instance, in using rotary furnaces, there is the additional difficulty of preventing the charge from sticking to the walls of the furnaces.

The chief object of this invention is to overcome such drawbacks and to render it possible to reduce pulverulent metal oxides, particularly iron oxides, economically without any risk of re-oxidation. The invention refers to a method and a plant for that purpose and also to the product thus produced.

A further object of this invention is to render it possible to produce, from pulverous oxide ores, solid massive sintered bodies or even molten ingots in one single operation in one and the same furnace.

A further object of this invention is to carry out the process with high economy using a complete combustion in the furnace and recovering the heat as far as possible.

A further object of this inventon is to provide for efficient means for preventing re-oxidation though air is admitted to the furnace.

A further object of this invention is to effect the reduction proper exclusively by means of admixed carbon material and to heat the furnace by means of reducing gas flames within the furnace.

Another object of this invention is to mix the metal oxide with carbonous material of such quality that it does not itself issue any substantial quantity of gas, containing reducing constituents when said carbonous material is heated.

A further object of this invention is to supply the air of combustion necessary for the burning gas flames in such manner that the gas burns immediately adjacent to the air supplies or inlets but does not contact with briquettes.

Other objects of this invention will be evident from the following specification and claims.

In carrying out the method in accordance with this invention finely divided or pulverized metal oxide, such as iron oxide, is intimately mixed with finely divided carbonous material substantially, in the proportions suitable for a complete reduction so that the reduced metal obtained will not contain any considerable excess of carbon, and the mixture is formed to briquettes or blocks which are thereafter heated in a channel or tunnel furnace to the temperature necessary, the temperature being raised continuously so that the reduced metal sinters to solid massive pieces or melts to ingots while shrinking (reducing its volume), whereupon the temperature is successively reduced, the briquettes being heated in the furnace exclusively by radiant heat from gas flames of a reducing character burning within the furnace.

The metal sponge primarily produced is sintered in direct connection with the reduction and after the reduction has been finished but in the same continuous process, as a result of a continuous rise of temperature so that the final product is almost solid, rather non-porous pieces of sintered metal. By raising the temperature further after the sintering, the sintered briquettes may in the same process be molten to form ingots.

The risk of re-oxidation always occurring in such processes is reduced in different ways by use of this invention. For that purpose, a partial or incomplete supply of air is used so that a certain excess of carbon monoxide or hydrogen or both is always at hand and thus the presence of free oxygen at the prevailing high temperature is prevented. In addition said excess of carbon monoxide and/or hydrogen is in accordance with this invention maintained at a high value at the end of the process, when the risk of re-oxidation is highest, but low at the beginning of the process. In this manner the heat energy generated by the gas by combustion may be completely utilized and practically no considerable quantity of carbon monoxide or hydrogen escapes from the process.

It has been found that the risk of re-oxidation is particularly small if the process is carried out in a channel furnace because in such a furnace the partial air supply may be arranged at a great distance from the charge without impairing the supply of heat. For this reason the supply of air to the channel furnace is effected through air inlets in elevated parts of a furnace arch, said air inlets being so constructed that the oxygen of the air burns immediately after having entered the furnace and can consequently not contact with the charge proper. In said elevated parts the gas rich in carbon monoxide which is evolved by the charge, is combusted together with combustible additional gas supplied from the outside. To reduce the risk of a re-oxidation the height of the air inlets above the briquettes is increased the more the farther off the inlets are situated from the inlet or introduction end of the furnace.

In using a channel or tunnel furnace the charge is, preferably, moved through the furnace on carriages or cars lined with refractory bricks. The charge formed to briquettes is loaded in such manner on the cars that the gas passing above the briquettes in the longitudinal direction of the furnace cannot penetrate downwards between the briquettes. To effect this, the briquettes are placed tightly together in laterally extending rows or lines and lateral free spaces are left between the rows. The gas rich in carbon monoxide generated by the briquettes, when heated, and flowing upwards then prevents the gases of combustion from penetrating downwards between the briquettes and from re-oxidizing the metal already reduced. In other words, the reducing gases formed by the briquettes, when heated, form a sort of screen above the cars and let the radiant heat from the gas flames pass but preventing the oxygen of the air of combustion from contacting with the briquettes.

Because the risk of re-oxidation is highest on the surface of the briquettes, a layer or cake of hard-pressed pulverulent carbon material, for instance graphite powder, may be placed on the surface thereof. As a rule it suffices to place such layer only on the upper sides of the briquettes. On account of the high heat conductivity of graphite, such layer does not considerable impede the supply of heat to the interior of the briquettes.

A comparison with the arrangements in the prior art for carrying out reduction processes in shaft furnaces, open reverboratory furnaces, Martin-furnaces or rotary furnaces shows that in such types of furnaces it is scarcely possible to avoid that the charge contacts with free air (free oxygen) causing already reduced metal to be re-oxidized, but it is evident that said risk may be eliminated in a channel furnace.

It has been found that, for instance, in producing iron from carbon-slick-briquettes which without any particular adhesive and without disintegration may be reduced by heating, it is suitable to use carbon materials which do not themselves generate any reducing gases, when heated to 800–900° C., which have a high specific gravity and whose reducing action sets in only after such high temperature has been reached that the grains of the briquettes have already begun to sinter, thus giving the briquettes a certain resistance. For this reason, for instance, charcoal is not suitable, because pulverized charcoal generates reducing gases, particularly hydrogen, already at 500 to 600° C. In addition the carbon substance in charcoal begins its reducing action already at 700° C., i. e. before the grains of the briquettes have begun to adhere to each other and consequently before the briquettes have attained any considerable resistance. Moreover, briquettes containing charcoal will, on account of the low specific gravity of charcoal, have a low specific gravity themselves and be porous, thus reducing the resistance. Upon being heated such charcoal-ore-briquettes will generally swell and disintegrate and the metal sponge formed is easily re-oxidized, because it attains an extremely porous (spongy) consistency, when it is formed.

In using pulverized coke or graphite there is a great difference. Said materials generally practically do not contain any volatile reducing constituents. When said materials are mixed with iron oxides (such as slick) and heated, the reduction will not begin until at about 800° C., when coke is used, and at 900 to 1000° C. when graphite is used, and substantially only carbon monoxide or a gas rich in carbon monoxide will be evolved. Consequently substantially no reduction will be initiated, i. e. no gases will be evolved, until the briquettes have attained such high temperature that the sintering thereof has already begun. Thus, when coke or graphite is used in the briquettes, the reduction is not accompanied by any swelling or disintegration of the briquettes, and after the reduction has been carried out to a certain extent, an increase of temperature will on the contrary cause a certain shrinking (reduction of volume) and upon further rise of temperature the metal sinters to solid pieces. Furthermore, said two materials have a high specific gravity, compared, for instance, to that of charcoal, and in using the same pressure in the pressing process the carbon-slick-briquettes produced from said first-mentioned materials will have a specific gravity two times as high as that of such briquettes produced from charcoal, and consequently be very compact.

Indeed, the use of coke has the drawback that the content of sulphur therein remains in the metal finally produced and in many cases lowers the quality thereof, for instance in producing iron. In graphite, in which the sulphur possibly occurring is generally in the mineral state, the contents of sulphur may more easily be removed in advance, and that fact in combination with the superior heat conducting power of graphite renders the graphite particularly suitable as reducing agent in the method in accordance with this invention. It is to be observed that native graphite exists which is practically free from sulphur. As far as the percentage of sulphur in coke may in advance be reduced by suitable or known methods, the coke becomes more useful for this purpose.

Also petroleum coke, which is obtained as a solid remainder in the dry distillation of crude oil, may advantageously be used in carrying out this invention. It is true that such coke, as it is commercially supplied from the distillation plants, still contains volatile components, particularly heavy hydrocarbons which escape at 400 to 500° C., but these components are not per se reducing at that temperature, and the remaining pure coke substance has not any reducing action until at a temperature of 800 to 900° C.

No difference in the velocity of reduction was found in using coke or graphite at the high temperatures used. In contrast thereto, the velocity of reduction varies with the fineness of the charge and is increased, when the fineness increases. But the velocity of reduction is not further increased, when the charge is ground to such fineness that the size of grains falls substantially below about 0.050 mm.

To effect sintering and shrinking to massive pieces it is necessary to raise the temperature successively to a point adjacent to the melting point of the metal. For iron the sintering temperature is about 1300° C. As a result of the high increase of temperature, also a more complete reduction to the very centre of the briquettes and a consistency more convenient for the following melting procedure, i. e. a higher specific gravity is attained than was possible by use of known methods. Such high specific gravity is also advantageous if the subsequent melting is effected in another furnace. If the process is carried out in such manner that the temperature is in the process raised up to and above the melting point so that a melting is attained, the refractory base constructions should be shaped in such manner that the molten metal after solidification gets a suitable shape for the subsequent working.

In burning to carbon dioxide the gas rich in carbon monoxide generated at the reduction theoretically sufficient quantities of heat are attained, in producing iron, for carrying out the process, but in the practice an additional supply of heat is necessary. Because it is necessary to maintain such furnaces at a (adjustable) pressure above atmospheric to prevent air from being sucked in through possible leaks in the brick work, said additional supply of heat is, preferably, effected by supplying a combustible gas at a pressure above atmospheric, which is then combusted together with the reduction gas rich in carbon monoxide. To utilize the heat of the finished product efficiently, said additional gas supplied from the outside may be caused to sweep over the finished (reduced) product to cool the latter, while simultaneously such gas is pre-heated. To prevent said gas from oxidizing the finished hot product, said additional gas must not contain a high percentage of carbon dioxide and steam (water). If products free from sulphur are desired, said gas must also be free from sulphur and objectionable sulphur compounds. For this reason, if the generator gas is produced from wood, such wood must be dried in advance to remove most of the water therein. The water mechanically bound escapes already at the heating of the wood to about 105° C., while the chemically bound water is removed only at such temperatures as effect a beginning or carbonization, i. e. about 270° C.

In producing iron the quantity of carbon material and additional gas must be chosen with regard to the carbon percentage to be had in the iron finally produced i. e. generally 0.1 to 1% carbon.

An embodiment of a plant in accordance with this invention is shown in the annexed drawings.

Figs. 1a and 1b show together a vertical longitudinal section through a channel furnace for carrying out this invention, Fig. 1a being the left and Fig. 1b the right part of the furnace. Figs. 2a and 2b show a graph of the temperature illustrating the temperatures in the different parts of the furnace, i. e. the temperature of the charge in different positions in the furnace. Fig. 2a corresponds to Fig. 1a and Fig. 2b to Fig. 1b. The two drawings may be joined together to show the entire plant.

In Figs. 1a and 1b of the drawings a channel furnace is shown having an inlet door or shutter A at its introduction end. Through said door the charge cars B are entered and fed successively to the discharge door or shutter C at the opposite end of the channel. The furnace has a recuperative heating device D through which a part of the gases of combustion from the furnace escape, while the remainder of said gases are drawn off through the chimney E at the inlet end of the furnace. In the apparatus D a heating coil G having an inlet F for fresh or cool air is arranged and the air pre-heated in said coil is sucked by a fan H and blown into the upper arch of the furnace through a number of air inlets $J_1$, $J_2$, $J_3$, $J_4$, $J_5$, arranged in elevated parts $K_1$, $K_2$, $K_3$, $K_4$, $K_5$ of the furnace arch; said elevated parts are the higher the farther off they are situated from the inlet opening A, i. e. the height increases from $K_1$ which is lowest to $K_5$ being highest. By preference, the height of the air inlet above the upper surface of briquettes is $\frac{1}{5}$ to $\frac{1}{40}$ of the distance from the corresponding air inlet to the introduction end of the furnace. As seen from the drawings, the air inlets $J_1$—$J_5$ discharge in such manner in the elevations $K_1$—$K_5$ that the current of hot air pressed in is almost horizontal and directed to the inlet opening A. Thus, it is avoided that free oxygen is blown down on the charges on the cars B. It is to be observed it is essential that the oxygen supplied shall be combusted (combined) at the top of the elevations $K_1$—$K_5$, i. e. just at the discharge openings of the inlets $J_1$—$J_5$. For this purpose, said elevations have their walls S at comparatively small angles to the horizontal, thus rendering it possible for the combustible gas to flow upwards into said elevated parts and be combusted at the tops thereof adjacent to the openings of the air inlets.

L is an inlet for generator gas at a pressure above atmospheric. Said gas fills the channel between L and the outlet C and flows further in the channel between L and $K_5$ in contact with the hot briquettes and is heated by them and cools them. The part of the furnace arch next to the outlet end has double walls and is provided with an inlet M for cool air and an outlet N for pre-heated air which is sucked out by a ventilator O. The hot air drawn off from the pipe N may, by preference, be used for operating the gas generators or producers. The cool air entering through the inlet M will further cool the briquettes on the cars B. At the outlet door C a cooling car P is shown, in which the briquettes are further cooled, preferably in the absence of air, for instance, by spraying cooling water on the outside of the car.

The cars loaded with carbon-ore-briquettes are, by preference individually, entered through the door A and successively fed towards the outlet C. In the beginning they are successively heated by the gases of combustion and by the gas flames flowing from the arches $K_1$—$K_5$ above the briquettes in the direction opposite to that of the cars. Said gas flames have a reducing character and already at the first air inlet $J_1$ the supply of air and combustible gas is controlled in such manner that a sufficient temperature for initiating the reduction is attained but no excess of air is at hand. The gas then evolved from the briquettes and substantially consisting of carbon monoxide, mixes successively with the generator gas and is also combusted in the elevations $K_1$—$K_5$ in the furnace arch. The quantities of heat necessary for completing the reduction are thus generated and the temperature rises successively as the cars are fed forwards and reaches its maximum adjacent to the air inlet $J_5$. The supply of air is controlled so as to give the desired successive rise of temperature. Because the supply of air is effected through a plurality of air inlets $J_1$—$J_5$ arranged after each other, an extremely exact control of the quantity of air supplied and of the combustion in different parts of the channels is attained.

As stated above, substantially no gases of combustion penetrate downwards between the briquettes. The briquettes are, consequently, heated substantially exclusively by radiant heat from the gas flames. The gas rich in carbon monoxide, which is generated in the briquettes, when heated, flows upwards and forms a screen above the briquettes protecting them from contact with the gases of combustion and the air of combustion. Said screen is—at least adjacent to the briquettes—to some extent stationary and does not move much in the longitudinal direction of the furnace.

Fig. 2 shows an approximate graph of the temperatures in the furnace shown in Fig. 1, when used for producing iron. The dash-and-dot lines indicate that the abscissae in Fig. 2 correspond to similarly situated points in Figs. 1a and b.

In the gases of combustion formed above the briquettes the percentage of carbon dioxide and steam (water) increases as the gases approach the branch point for the heat device D. If the supply of air at the air intake $J_1$ is controlled in such manner that no excess of carbon monoxide and hydrogen is at hand in the combustion gases, a mixture consisting practically only of carbon dioxide, steam and nitrogen is drawn off from the furnace. Said mixture of gases has at the inlet to the apparatus D a temperature of about 700° C. and said temperature is utilized in as much as part of the gases pre-heat the air of combustion in the apparatus D. The remainder of the gases of combustion are utilized for pre-heating the briquettes between the inlet to the apparatus D and the inlet A and are finally drawn off through the chimney E.

The speed of the cars is controlled in such manner that at $J_5$, at which the highest temperature is reached, the reduction and the sintering and possibly also the melting, if any, are finished, whereupon the finished, reduced metal exchanges heat with the generator gas from the gas inlet L and is further cooled between L and C and is finally taken out in the atmosphere via the cooling car P.

The process in said furnace is very economical, because the charge is entered in a cool state and the finished product is taken out in a cool state, and further the gas escaping from the system is also cool, when taken out, and does not contain any substantial quantity of combustible components.

The number of air inlets and the length of the different parts of the channel should, of course, be chosen in accordance with the circumstances in each particular case.

What I claim is:—

1. A method of producing metal from a metal oxide, which comprises, mixing finely divided metal oxide intimately with finely divided carbonous material substantially in the proportions convenient for complete reduction, forming said mixture to briquettes, passing said briquettes through a channel furnace, heating said briquettes in said furnace substantially exclusively by means of radiant heat from gas flames of reducing character burning within the furnace, increasing the temperature continuously to at least sintering temperature for the metal reduced, to cause the reduced metal to shrink to massive pieces, and finally successively lowering the temperature.

2. A method of producing metal from a metal oxide, which consists in mixing said oxide in a finely divided state with carbonous material substantially in the proportions just sufficient for complete reduction of the metal without leaving any considerable excess of carbon in the metal reduced, said carbonous material being substantially free from such volatile components of reducing character as will escape, when said carbonous material is heated, shaping said mixture of metal oxide and carbonous material to briquettes, passing said briquettes through a tunnel furnace, supplying heat to said briquettes in said tunnel furnace substantially exclusively by means of radiant heat from gas flames of a reducing character burning with the furnace, increasing the temperature continuously to at least sintering temperature for the metal reduced to cause the reduced metal to shrink to massive non-porous pieces, and successively lowering the temperature.

3. A process for the reduction of metal oxide ores, consisting in mixing the pulverized ore with a pulverized carbon material in a quantity just sufficient to reduce the metal without leaving any considerable excess of carbon therein, forming said mixture to briquettes, passing said briquettes through a channel furnace, supplying combustible heating gas to said furnace, supplying air of combustion to said furnace to combust said heating gas in flames of a reducing character just adjacent to the air inlet without contacting with said briquettes, the briquettes being moved counter-currently to said heating gas, raising the temperature in said furnace to cause said ore to be reduced and the reduced metal to sinter to substantially non-porous bodies, while shrinking, and lowering the temperature.

4. A process for the reduction of metal oxide ores, consisting in mixing finely pulverized ore with a pulverized carbon material in a quantity just sufficient to reduce the metal without leaving any considerable excess of carbon therein, forming said mixture to briquettes, passing said briquettes through a channel furnace, supplying combustible heating gas to said furnace, supplying air of combustion to said furnace, said heating gas being caused to sweep up to the very discharge openings of said air inlets to be combusted in flames of a reducing character just adjacent to the air inlets without contacting with said briquettes, the briquettes being moved counter-currently to said heating gas, raising the temperature in said furnace to cause said ore to be reduced and the reduced metal to sinter to substantially non-porous bodies, while shrinking, and lowering the temperature.

5. A process for the reduction of metal oxide ores, consisting in mixing pulverized ore with a pulverized carbon material in a quantity just sufficient to reduce the metal without leaving any considerable excess of carbon therein, forming said mixture to briquettes, passing said briquettes through a channel furnace from its introduction end supplying combustible heating gas to said furnace, supplying air of combustion to said furnace to burn said heating gas in flames of a reducing character just adjacent to the air inlets without contacting with said briquettes, the briquettes having moved counter-currently to said heating gas, said air of combustion being let in the higher above said briquettes the farther the corresponding air inlet is situated from the introduction end of said furnace, raising the temperature in said furnace to cause said ore to be reduced and the reduced metal to sinter to substantially non-porous bodies, while shrinking, and cooling said bodies.

6. A process for the reduction of metal oxide ores, consisting in mixing the pulverized ore with a pulverized carbon material in a quantity just sufficient to reduce the metal without leaving any considerable excess of carbon therein, forming said mixture to briquettes, passing said briquettes through a channel furnace, simultaneously producing combustible gas in a gas producer charged with wood, which was heated to a temperature sufficient to drive off water from the wood, said temperature being at most 270° C., before the wood is introduced into said gas producer, supplying said combustible heating gas to said furnace, supplying air of combustion to said furnace to burn said heating gas in flames of a reducing character just adjacent to the air inlets without contacting with said briquettes, the briquettes being moved counter-currently to said heating gas, raising the temperature in said furnace to cause said ore to be reduced and the reduced metal to sinter to substantially non-porous bodies, while shrinking, and lowering the temperature of said bodies.

7. A process for reducing metal oxide ores, comprising, mixing the pulverized ore with a quantity of carbon material substantially just sufficient to reduce the metal without leaving any considerable excess of carbon therein, forming said mixture of ore and carbon material to briquettes, passing said briquettes progressively through a channel furnace, injecting combustible gas at a pressure above atmospheric into said furnace, injecting air into said furnace in a controlled quantity partially to combust said combustible gas and the gas evolved from said briquettes, when heated, just in the immediate vicinity of the air inlets without contacting with said briquettes, raising the temperature in said furnace to cause said ore to be reduced and the reduced metal to form massive pieces while shrinking, passing said combustible gas in contact with said massive pieces for heat-exchange, and further lowering the temperature of said briquettes.

8. A process for reducing metal oxide ores, which comprises, mixing the pulverized ore with a quantity of carbon material substantially sufficient to reduce the metal without leaving any considerable excess of carbon therein, forming said mixture to briquettes, passing said briquettes successively through a channel furnace, combusting gases in said furnace to heat said briquettes to raise the temperature of said briquettes continuously thus causing reduction and the reduced metal to shrink to substantially massive bodies, lowering the temperature of said briquettes successively, dividing the gases of combustion into two currents, passing one of said currents through a heat exchanger to pre-heat the air of combustion, and passing the other of said currents above the briquettes just introduced into said furnace to pre-heat them.

9. A method as claimed in claim 1, wherein the briquettes are loaded in laterally extending rows on cars to the entire width of said cars, free spaces being left only between said rows, said cars being passed through said furnace.

10. A method as set forth in claim 1, wherein at least either of said metal oxide and said carbonous material before the briquetting step are ground to such fineness that the main portion thereof has a size of grain up to 0.050 mm.

11. A method of reducing iron oxide ores, which comprises, mixing finely divided iron oxide ore intimately with a carbonous material in proportions sufficient to completely reduce said ore, forming said mixture to briquettes, passing said briquettes through a channel furnace, supplying combustible gas to said furnace and burning the same therein to heat said briquettes substantially by means of radiant heat from gas flames only, the quantity of carbonous material and combustible gas being chosen in such manner as to leave an average carbon content of 0.1 to 1.0% in the reduced iron, raising the temperature of said briquettes successively as they are passed through said furnace to at least sintering temperature for iron to cause the reduced iron to reduce its volume and form massive pieces, and finally successively lowering the temperature of said pieces of reduced iron.

BROR CHRISTIANSEN.